Sept. 10, 1935.  H. SCHÜTTE  2,013,994
VEHICLE BODY SUPPORT
Original Filed July 16, 1920

Hermann Schütte
INVENTOR
BY John H Roury
his ATTORNEY

UNITED STATES PATENT OFFICE 2,013,994

VEHICLE BODY SUPPORT

Hermann Schütte, Swissvale, Pa.

Refiled for abandoned application Serial No. 396,770, July 16, 1920. This application June 4, 1931, Serial No. 542,072

4 Claims. (Cl. 280—104)

My present invention relates to improvements in cushioning supports for vehicle bodies and has for its object the relatively level support of the body upon the wheels or axles irrespective of momentary vertical wheel movements, and is particularly applicable to road vehicles, such as automobiles, intended to travel at high speeds over rough roads. The present application is a substitute for applicant's abandoned application serially numbered 396,770 filed July 16, 1920.

I accomplish my object in a novel manner, including principles heretofore not applied to the support of mobile loads, for the efficient support of vehicle bodies.

In a broad sense, my present invention embodies the application and interposing between the wheels or axis, and the body of the vehicle, of a multiple unit intercommunicating fluid pressure supports system, for the resilient support of the body upon the wheels or axles, and means for stabilizing and balancing the body under variable distribution of loads or while the wheels meet with road obstructions.

It is apparent that a multiple unit intercommunicating fluid pressure support system of constant ratio fluid displacement characteristic cannot given very satisfactory results for the support of vehicle bodies. Since the static fluid pressure is the same in all parts of such a system, the different supports can only be expected to sustain their respective shares of the load in consequence of the prevailing fluid pressure. If any additional load is applied which acts upon one individual support only, this will raise the pressure throughout the system and thus increase the buoyancy of all the other supports, with the result that if the remaining loads remain the same, the more heavily loaded support will dive down, and all the other supports will rise, or float up so to speak, to the limit of its travel and thereby render the whole system ineffective for further service since the more heavily loaded supports can not return to normal operative positions as long as the uneven distribution of load remains.

To overcome these shortcomings I employ individual supports of variable ratio fluid displacement characteristic in conjunction with the inter-communicating fluid pressure system to supplement its effectiveness and make same more efficient for the support of vehicle bodies.

Constant ratio characteristic supports may be defined as supports whose effectiveness is a product of the momentary fluid pressure multiplied with a constant design coefficient of the support, while under variable ratio characteristic supports I understand such supports whose effectiveness is a product of the momentary fluid pressure multiplied with a variable coefficient implemented with the design of the support or supplemented thereto.

In terms of their present application, variable ratio characteristic supports may be classified as, supports capable of displacing in an increasing measure more fluid, or as supports capable of decreasing their volumetric fluid contents in an increasing measure, as the distance between the wheels or axles and the body of the vehicle decreases from additional load or from the striking of road obstructions by the wheels; or as supports capable of sustaining increasingly greater loads against constant fluid pressure as the body moves down toward the wheels or the wheels move up toward the body.

Under support-reaction is to be understood the returned forces of the supports to resist the imposed loads or equivalent wheel movements due to the uneven road contour. Since the support-reactions constitute the load supporting forces, it is important that they be definitely governed or controlled with relation to the relative wheel movements. If it is further considered that the reactions are derived from the fluid pressure and the rate of fluid displacement in the supports, it is evident that variable fluid displacements must return variable reactions, or in other words, that the ratio or fluid displacement in the supports and their reactions are in close, fixed relation to each other. Supports of variable ratio fluid displacement characteristic therefore are bound to produce variable reactions of like or similar characteristic. Since now in any intercommunicating system the pressure is the same throughout, and in an efficient vehicle support of this type I maintain, reactions must be positive-variable, that is, changing inversely to the distances of the wheels to the body, the fluid displacement of the individual supports must also be positive-variable, or vary very inversely to the distances of the wheels to the body or load.

To obtain this important positive-variable ratio fluid displacement and reaction characteristic, I impart with each individual or each similarly affected group of supports compensating means for governing or controlling the ratio of fluid displacement for a given relative movement of the wheels to the body. Such compensating means permits me to build up the corresponding supporting forces to meet any uneven load distribution with but small accommodating deflections of the different supports, and thus to sustain an uneven distributed load in a relatively balanced position with supports of identical construction under a uniform fluid pressure. Different equivalent methods and means may be used to effect such ratio change without departing from the scope of this invention. In the exemplification chosen to illustrate my invention in a diagrammatic manner I employ bell cranks of changing effective leverage proportions in such a manner that the rate of advance of the fluid displacing pistons is progressingly boosted or accelerated for approaching movements of the load and support structures, and thus a desired ratio of increased cubical fluid contents displacement is established in a simple and effective manner.

As the rate of fluid displacement is increased for approaching movements of the wheels and body, so I provide for the reverse or receding movements a decrease in the ratio of fluid absorption into the affected supports for the purpose of reestablishing quickly and precisely a balanced condition between reactions and load after a disturbance. This, double, oppositely effective cross-relation, is another important feature of my invention, since it tends to eliminate oscillations of the vehicle body when adjusting itself to a new, corrected position.

To meet the principal requisites for an efficient vehicle body suspension, softness and resiliency against vertical wheel movements and firmness and stability of the body irrespective of momentary wheel movements, is one of the objects of this invention. To accomplish this object the sprung to unsprung weight ratio of the vehicle in question must be recognized as an important factor in connection with the suspension. For a like suspension it is apparent that a maximum of sprung with a minimum of unsprung weights will render the best riding vehicle. To approach this condition one may reduce the weight of the unsprung parts or increase the weight of the sprung part or the load, both steps, are very limited by other considerations, as decrease of the weight of the unsprung parts tends to weaken these parts, and any increase of the sprung weights beyond the necessary is found impractical for reasons of economy. With my freely intercommunicating fluid pressure suspension system the sprung to unsprung weight ratio is automatically temporarily increased whenever one wheel strikes a road obstruction. Since the wheel by its upward movement forces the fluid from the one support into the remaining supports of the system it is seen that the entire weight of the vehicle body counteracts to an extent the movement of the wheel instead of the weight of the part of the body directly above it only.

Another advantage of my freely intercommunicating multiple unit fluid pressure suspension resides in the increased body of fluid subject to compression with each supporting unit, combining a maximum of resiliency with the support of the load under average riding conditions. If, on the other hand, the vehicle travels at high speeds and the wheels encounter obstructions of great magnitude, compelling the supports to respond extremely quickly, an overpressure is built up in the supports for the reason that the fluid cannot flow off as fast through the fluid passageways as the pressure is built up. In this case an increasingly greater resistance is offered the wheels while on their upward stroke and this tends to limit the stroke of the wheel to the smallest distance required to clear the obstruction and also reduces the risk of the axles to strike the body of the vehicle under such extreme conditions. Since the overpressure built up in the local unit continues to flow off while the wheel has reached the peak of its upward movement, the force or pressure for returning the wheel to its normal position is very rapidly decreased. This characteristic is most beneficial for eliminating the disagreeable rebound tendency and makes my supporting system particularly efficient for high speed motor vehicles.

To obtain the full benefit of the reflex effects to all the remaining supports if one support is acted upon, it is evident that the fluid contents of the entire system must be constant. In addition to the constant fluid contents employed in the system for any given load, I provide suitable means to adjust the pressure in the system to make the supports capable of sustaining greatly varying loads within their best range of efficiency. In order to facilitate the adjustment of the amount of fluid under pressure in the system I provide preferably a storage tank containing fluid of higher pressure, or any other suitable means, for charging the system, and also provide an exhaust permitting a reduction of the fluid in the system if such is desired for the support of lighter loads or some other reason. Both valves may, if so desired, be combined and either automatically or manually operated as found most convenient and economical for different classes of vehicles. The feature of being readily adjustable for different loads is another important advantage incorporated with my present invention as it permits me to operate the vehicle always within a pressure range best suited for certain loads and road conditions.

I accomplish these several objects by means of the mechanism, which briefly stated, comprises a self-adjusting, fluid pressure actuated mechanism upon which the vehicle body is supported. The said fluid pressure mechanism being interposed between the sub-structure of the vehicle and the body portion, being connected thereto by means of mechanical connections, one exemplification of which means includes the apparatus hereinafter more specifically described, reference being had to the accompanying drawing, forming part hereof, in which Fig. 1 is a side elevation of a vehicle with my improvement applied thereto, the body portion being removed.

Figure 1:
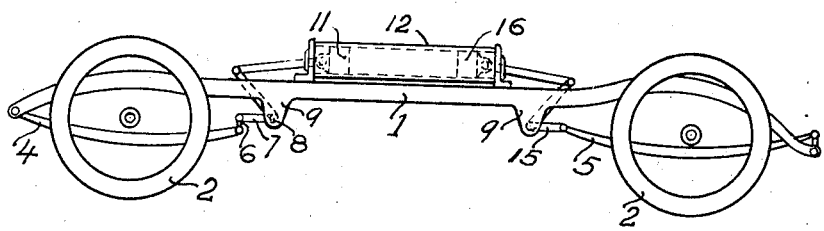
Figure 2:
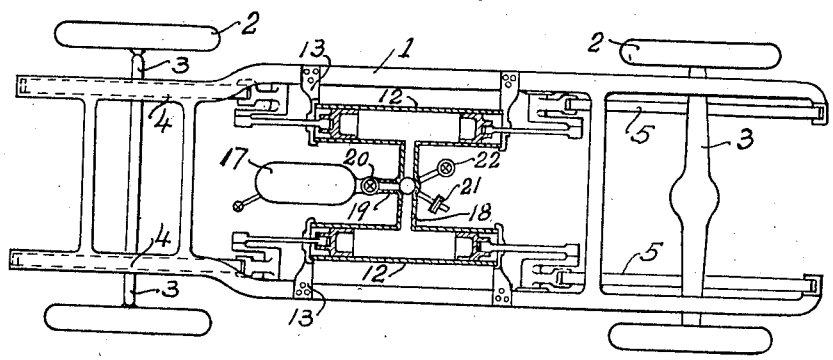
Fig. 2 is a plan view of the same.

Referring to said drawing and particularly to Figs. 1 and 2, 1 is a frame or chassis of an automobile of any usual type and construction, supported upon the wheels, 2, which are mounted upon axles, 3. The body of the vehicle, not shown, is mounted as usual upon the springs, 4—4, 5—5. The inner ends of the springs, 4—4, are connected to an arm rod, 6, the opposite end of which is pivotally connected to the lower member of the ratio bell cranks, 7, which are mounted upon the shafts, 8, supported in lugs, 9, which are integral with or attached to the frame of the vehicle, upon which the body is secured. The upper ends of the said bell cranks are secured to the pistons, 11, operably seated in the forward end of the cylinders, 12, which are secured to the frame by means of the straps, 13. The inner ends of said springs, 5, are directly connected to the ratio bell cranks, 15, which are connected to pistons, 16, operably seated in the rear end of said cylinders, 12.

It will be observed that the two arms of bell cranks 7, 15 and 25 are not shown at right angles with regard to their pivotal supports. This is important, since it serves to provide means to take care of locally varying loads under one supporting pressure by changing oppositely the effective leverages of the respective bell crank members connected with the supports and pressure pistons respectively in consequence of the deflection of the bell cranks caused by varying loads or temporary dislocation of the support members. Without this arrangement it would be practically impossible to make a system of the character described for the purpose intended, since no equilibrium or static balance could be obtained without a definitely changing relationship of the support pressure arms and load arms of the bell cranks. Intermediate said cylinders and suitably mounted upon the frame of the vehicle, I provide a reservoir, 17, which is adapted to be connected to any source of fluid supply and to contain fluid under pressure. The said reservoir is connected to a transverse conduit, 18, by means of a conduit, 19, in which is located the valve, 20, for the purpose of controlling the fluid conveyed from said reservoir to the said conduits. The said transverse conduit, 18, connects the cylinders 12, so that fluid pressure supplied from the reservoir, 17, is uniformly and equally distributed throughout said cylinders or system. The said transverse conduit may be provided with an exhaust, 21, and a gauge, 22, to register pressure in said conduits and cylinders.

Figure 3:
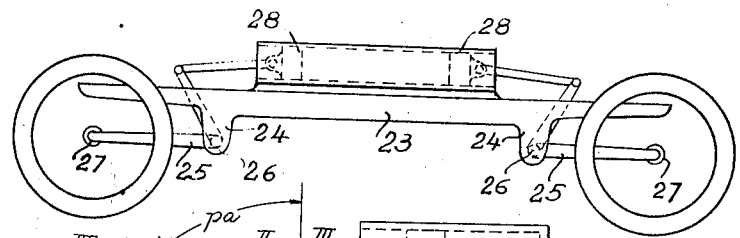
Fig. 3 is a side elevation of a modification of the device shown in Fig. 1.

In Fig. 3, I show a modification of the device described. In said figure, the side frame, 23, of the vehicle is provided with downwardly projecting lugs, 24, on which bell cranks, 25, are mounted on a shaft or rod, 26, the horizontal members of said bell cranks being lengthened and connected directly to respectively the forward and rear axles, 27, of the vehicle, the upper members of said bell cranks being pivotally connected to the pistons, 28, which are operably seated in cylinders similar to those of Fig. 1, the structure of Fig. 3 being identical with that of Figs. 1 and 2, except that the springs are omitted and the body supporting connections are directly connected to the axles.

Figure 4:
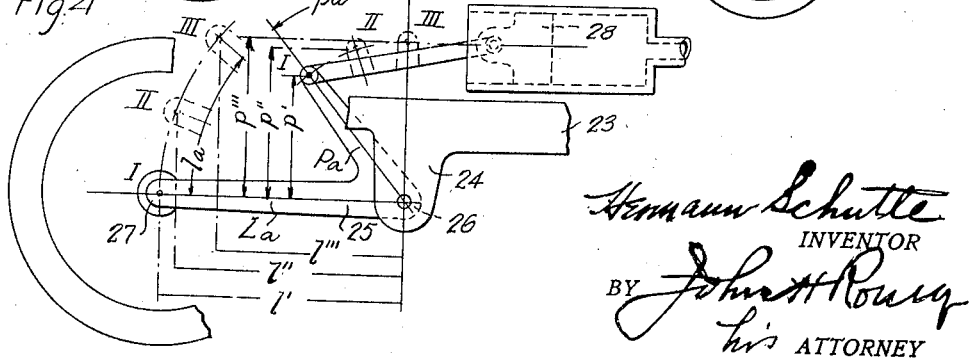
Fig. 4 is an enlarged view of a single support unit illustrating the ratio governing means and the transformation of the effective lengths of its load and power arms for different operating positions as indicated in dotted lines.

In Fig. 4 of the drawing, 25 represents the double action ratio crank, or bell crank, comprising the load-arm $La$, and the power-arm $Pa$. The distances $l'$, $l''$, $l'''$ and $p'$, $p''$, $p'''$ represent their respective projected or effective leverages while the cranks are progressively moving through the arcs $la$ and $pa$, successively from positions I to II and III.

Figure 4 illustrates that for a given successive movement of the crank from position I to II and III, the effective corresponding leverages $l'$, $l''$, $l'''$ and $p'$, $p''$, $p'''$ change in opposite direction, or in other words, while the effective load-arm leverages are getting shorter, the power-arm leverages increase in their effective length at the same time for the crank movement referred to, and vice versa for the return or opposite movement of the crank.

If the character "L" be adapted to designate the weight or load to be sustained, and the character "P" for the power in the form of the counteracting fluid pressure required to sustain such load "L", a balanced support may now be expressed mathematically through the equation: $L \times l = P \times p$, which, properly reduced, may be changed to read:

$$P = \frac{l}{p} \times L,$$

in which equation, it is easily seen, the quotient of the effective load-arm leverage divided by the effective power-arm leverage appears as a factor for the establishment or maintenance of the balanced support. Only a slight opposite variation in the effective leverages $l$ and $p$ of the load and power arm respectively due to a comparatively small angular movement of the crank arms produces transformation in the relationship of these structure elements whereby the support is made capable of sustaining under a constant fluid pressure variable size loads within any desirable practical range.

When angular movement of the ratio crank is progressing at a uniform rate for approaching movement of the axle toward the load supporting structure, the rate of travel of the piston is accelerated, and the rate of travel of the axle is decelerated. In other words, with reference to a uniform rate of upward movement of the axle, the differential or relative acceleration of the piston is greatly increased due to the compounding of the two oppositely varying leverage effects of the ratio crank arms.

Piston acceleration or the distance traveled by the piston represents volumetric fluid displacement and establishes the important fundamental co-relationship between axle movement and volumetric fluid displacement, inasmuch as a given approaching movement of the axle toward the load supporting structure causes a progressively increasing volumetric fluid displacement from the affected support, and a reverse, or receding movement of the axle causes a progressively decreased volumetric fluid absorption into the said respective affected support unit.

Any additional load placed locally upon the load supporting structure is the cause of a resultant movement of the ratio governing cranks of the affected suspension unit, said crank movements in turn become the cause of equivalent increase of volumetric fluid displacement, and local load increase produces equivalent increase of volumetric fluid displacement from the affected support unit of definite relative proportion.

Expressed in terms of movement, load and fluid displacement as a final analysis, the operation of the structure as disclosed by the drawing diagrammatically exemplifying one specific form of my invention, implies positively and clearly the relationship of progressive increased volumetric fluid displacement for approaching movements or added loads and corresponding progressive decreased volumetric fluid absorption for receding movements or diminishing loads.

Or, expressed in terms of movement, load and support-reaction, approaching movements of the wheels toward the load supporting structure produce progressively increased support reactions and any increased share of load acting upon a specific support unit will produce therein a corresponding increase of support reaction by virtue of the related relative movement referred to, and by reducing relative movements to distances, the claimed novel operating features may be designated as a multiple unit fluid pressure actuated supporting device in which the relative volumetric fluid displacement of the affected units changes inversely to the distances between the wheels and load supporting structure and in direct relation to the loads or load effects acting thereupon as the cubical fluid contents of the several support units is changed inversely to the loads acting upon them and in direct relation to the change of distances of the wheels to the chassis.

Fluid of any character is charged into the reservoir, and pressure applied until a predetermined pressure is attained which is distributed through the conduits 19, 18 to the cylinders, and acting upon the pistons in said cylinders and the load carrying supporting members connected therewith is sufficient to support and carry the weight of the vehicle body and whatever load may be placed thereon or therein or conveyed thereby. The pressure thus applied will put the pistons in the cylinders in approximately the position shown in the drawing and the weight of the vehicle body and its load will be carried and supported by the fluid pressure contained in said cylinders. The valve 20 in the conduit 19 being closed, the pressure in the conduits and cylinders being uniform and so maintained from the fact that free inter-communication is established therebetween. Any shock or jar occasioned by either of the wheels striking an obstruction in or on the road will be taken up and distributed without transmission to the vehicle body, and any excessive weight or pressure locally applied upon the body of the vehicle will not greatly disturb the relative horizontal position of the vehicle body to the sub-structure due to the peculiar disposition of the bell cranks at respectively the forward and rear end of the structure.

The advantages of my improved vehicle will be apparent to those skilled in the art. The special advantages are ease and stability in riding and a decided lessening of wear and tear upon the vehicle and upon the wheels and tires thereof.

Having described my invention, what I claim and desire to secure by Letters Patent, is:

1. A vehicle suspension comprising in combination with a wheeled understructure and a load supporting structure, a fluid pressure system consisting of a plurality of fluid chambers having communicating fluid conducting passageways for reciprocal uninterrupted inter-exchange of operating fluids between the separate chambers, said fluid chambers embodying relatively movable members for independently decreasing or increasing the cubical content of the separate chambers with reference to the remaining chambers, and means for decreasing the cubical content of said chambers at an increasing ratio in response to the increase of load on said means and for increasing the cubical content of said chambers at a decreasing ratio in response to the decrease of load acting on said means.

2. A vehicle suspension comprising in combination with a wheeled understructure and a load supporting structure, a fluid pressure system consisting of a plurality of fluid chambers having communicating fluid conducting passageways for reciprocal inter-exchange of operating fluids between the separate chambers, pistons in said chambers, bell cranks having one arm connected to the wheeled understructure and the other arm connected to said pistons, said bell cranks having their arms at an angle less than a right angle whereby the cubical content of said chamber is decreased at an increasing ratio in response to the increase of load on said bell crank arms, and is increased at a decreasing ratio in response to the decrease of load acting on said arm.

3. In a support for mobile loads, the combination with a substructure, and a load supporting structure, of a fluid pressure actuated system comprising a plurality of fluid pressure actuated supports interposed and connected to said substructure and said load supporting structure, the said system including a constant requisite amount of operating fluid distributed and enclosed within the said several supports, said supports having intercommunicating unobstructed passageways for reciprocal interchange of operating fluid among the several supports, and means responsive to movement of the substructure toward the supporting structure for reducing the cubical contents of fluid in any one support at a predetermined increasing ratio for approaching movements of the substructure and to increase the cubical contents of the fluid in said supports at a corresponding decreasing ratio for the receding movements of the substructure.

4. In a vehicle, the combination of a chassis and a plurality of wheel supports, a fluid pressure actuated suspension system comprising a plurality of fluid storage chambers intercommunicating by uninterrupted fluid passages and embodying means responsive to the relative movements of the wheel supports and chassis to progressively increase the resistance of the movements of the wheel supports toward the chassis under a constant fluid pressure.

HERMANN SCHÜTTE.